Patented Apr. 15, 1952

2,592,624

UNITED STATES PATENT OFFICE 2,592,624

CUTTING OIL CONCENTRATE AND METHOD OF MAKING SAME

Franklin Veatch and John G. Partch, Cleveland, Ohio, assignors to The Standard Oil Company, Cleveland, Ohio, a corporation of Ohio No Drawing. Application September 28, 1946, Serial No. 700,174

6 Claims. (Cl. 252—45)

The present invention relates to a new composition of matter suitable for use particularly as a cutting oil or as a concentrate to be added to a cutting oil, and to a process of preparing the same.

It is known generally that the "cutting ability" of a sulfur containing cutting oil improves with an increase in concentration of sulfur in the oil. It is also known that an increase in the concentration of sulfur in oils is generally accompanied by a rapid increase in optical density, i. e., oils with a relatively high sulfur content appear black and opaque. A high optical density is inherently undesirable for the reasons that the operator cannot scrutinize his work properly while the oil flows over the tool performing the cutting operation and he must halt the operation and wipe away the opaque oil to check on his work. Experience has shown that an oil of superior cutting ability and sufficient transparency for visibility is obtained when it has a stable sulfur concentration of at least 1.75% and an optical density below 900.

Two approaches have generally been followed in attempting to develop a satisfactory cutting oil. One of these has been to treat the oil by a sulfurizing process so that it will contain a desired concentration of sulfur while retaining an optical density below 900. Another approach to the problem has been that of forming an oil-soluble concentrate with a relatively high percentage of sulfur so that upon admixture with an oil, the mixture will have the aforementioned desired concentration of sulfur, and also retain an optical density below 900.

This invention is a novel development of the second approach to the problem of manufacturing an efficient cutting oil and its primary object is to provide a process of preparing an oil-soluble concentrate containing relatively high concentrations of stable sulfur, i. e., of the order of up to about 50% by weight.

This and other objects will become apparent from the disclosure of the invention.

It has now been found that an oil-soluble cutting oil concentrate of light color can be obtained by reacting olefins containing 4 or more carbon atoms per molecule with sulfur monochloride in the presence of a base.

This reaction may be carried out simply in the manner stated, or in order to avoid or minimize any difficulties encountered by the increasing viscosity of the reaction product, may be desirably carried out in a diluent. This diluent may be either an oil of the type that is usually used for cutting oil manufacture, or it may be any suitable volatile diluent that can be distilled from the cutting oil concentrate after its preparation. A paraffin oil such as a straw oil having a viscosity of 75 to 150 S. U. S. at 100° F. and hexane are examples of such diluents suitable for this process.

The olefinic reaction component may be any olefin, preferably those containing at least 4 carbon atoms and desirably a branched-chain olefin having about 6 to about 16 carbon atoms. Examples of suitable initial material are methyl and dimethyl pentenes, such as isomethyl pentene-2 and dimethyl pentene-2, di-isobutylene, tri-isobutylene, and mixtures thereof such as "motor polymer." Motor polymer is usually made from olefins containing three to five carbon atoms by non-selective catalytic polymerization to form olefins, mostly branched-chain, having 6 to 12 carbon atoms, and boiling in the motor fuel range.

The base may be any acid neutralizing constituent which will not react very readily with sulfur monochloride. Examples of such bases are the sodium, calcium and magnesium carbonates, calcium carbide, calcium cyanamid, and metal oxides, nitrides and acetates having the properties described. The base should be substantially dry since the presence of a substantial amount of water will increase the reactivity of the base with sulfur chloride. Anhydrous sodium carbonate in its commercially available form has been found to be particularly effective. In carrying out the reaction the amount of the base in the reaction product or in the reaction mixture preferably should always be in molal excess of the amount of sulfur monochloride. For example, the reaction preferably should always be carried out in the presence of approximately 1.1 mols of sodium carbonate per mol of sulfur monochloride.

The proportion of olefin to sulfur chloride may vary somewhat but generally the optimum amounts are those for theoretical completion of the reaction. The temperature should be one at which the reaction proceeds at a controllable rate and gives a light colored product. Generally this requires a temperature below 50° C.

Generally, the reaction of the branched-chain olefins with sulfur monochloride takes place with a ratio of 1 to 2 mols of sulfur monochloride per mol of olefin with the evolution of hydrochloric acid which is neutralized by the base as fast as it is formed. Only a small amount of chlorine is introduced into the molecule with the sulfur. When olefins in which the olefinic bond is at the end of the molecule are reacted with sulfur monochloride, however, the reaction appears to be a direct addition of the sulfur monochloride to the olefin with little or no evolution of hydrochloric acid.

The following examples illustrate more specifically the process of this invention and the results obtained thereby, it being understood however that the scope of this invention is not limited thereto.

Example 1

A mixture of 4275 grams of a straw oil having a viscosity of 75 S. U. S. at 100° F., 4050 grams of sulfur monochloride and 366 grams of sodium carbonate was placed in an open vessel of 5 gallon capacity, equipped with a stirrer and cooling coil. While the mixture was stirred rapidly, 213 grams of motor polymer were added. Subsequently additional motor polymer and sodium carbonate were added alternately in such a manner that there was present at all times an excess of the base. The addition was continued until 2130 grams of motor polymer and 3660 grams of sodium carbonate had been added. The temperature was maintained at a maximum of 35° C. After the last addition was completed the mixture was stirred for 6 hours. One gallon of 5% sodium sulfite solution in water and 200 cc. of concentrated ammonium hydroxide were then added. Stirring was then continued for an additional hour. The reaction mixture was then allowed to stand until the emulsion was broken and the organic layer was drawn off.

The original reaction mixture was found to contain 19% by weight of stable sulfur and 3.3% by weight of chlorine. Upon the addition of further straw oil to make a 20% concentration of the original product, the blend was found to have an optical density of 217.

This 20% concentration was then further diluted to a 5% concentration by the addition of a further quantity of straw oil. When so diluted, the made-up oil was found to have an optical density of between 75 and 100 and a concentration of approximately 1.5% total sulfur. Surprisingly, it was found that the concentrate, when diluted in a paraffin oil such as straw oil, will solubilize about 1.6 to 2.0% additional sulfur, thus raising the concentration of sulfur in the made-up oil to from 3 to 3.5%. The finished oil is very light in color and satisfactory from the odor standpoint.

The reaction product can be used effectively by itself, as a cutting oil, but generally would be used diluted with a cutting oil base.

As illustrative of the cutting function, the cutting oil reaction mixture, described heretofore, containing the oil diluent present during the reaction was used in cutting the threads of nuts formed from a special hard alloy for use in a jet propelled plane. It was possible to make an average of 2,000 nuts per tap when using the cutting oil of the invention as compared with 0 to 2 nuts per tap using the best prior cutting oil available on the market. This thousand-fold increase is particularly significant. Similar though somewhat less dramatic improvements are obtained when the reaction product is present in a smaller proportion in a cutting oil base.

The order in which the several reaction components are admixed is not critical provided the amount of base present is sufficient for its neutralizing function, as explained heretofore. The process of Example 1 may be carried out in an alternative procedure in which the sulfur monochloride is added carefully to a mixture of the motor polymer, base and diluent, if the latter is used. This order of addition may lessen operative hazards.

The sodium sulfite utilized in Example 1 was added for the purpose of taking up any sulfur that might be formed by the hydrolysis of sulfur monochloride because of the presence of the water which is employed to facilitate the settling out of any emulsion which forms. The ammonium hydroxide was added for the purpose of neutralizing any trace of hydrogen chloride which may not have been neutralized by the sodium carbonate. Both the sodium sulfite and the ammonium hydroxide additions may be eliminated, without adversely affecting the product.

For the purpose of comparing the reaction product of the invention with a similar reaction product in which a base is not employed, the following two examples are included:

Example 2

A reaction vessel is charged with 1600 cc. sulfur monochloride and 3320 cc. of a mixture of hexanes as diluent. A mixture of 1775 cc. of motor polymer and 2440 grams of sodium carbonate was added to the reaction vessel stepwise, and a maximum temperature of 41° C. was maintained. One gallon of 5 per cent sodium sulfite was added at the end of the reaction and the organic layer was separated and the diluent removed by vacuum distillation. The product contained 37.6% of sulfur and 9.8% chlorine and was light colored with little or no free or loosely bound chlorine. It possessed a viscosity suiting it as a cutting oil.

Example 3

A reaction vessel is charged with 6000 cc. of motor polymer and 2415 cc. of sulfur monochloride is added stepwise, while maintaining a maximum temperature of 30° C. This lower temperature is employed as a precautionary measure because of the absence of a base. At the end of the reaction one gallon of 5 per cent sodium sulfite and an additional half-gallon of water are added and the organic layer separated and washed. The product contains 31.5% sulfur and 12.6% chlorine, and is very dark, viscous and acidic.

It will be seen from a comparison of Examples 2 and 3 that the product of the invention comprises more sulfur and less chlorine, which is highly desirable, although this in itself does not indicate the real value of the resulting product produced in accordance with the invention, that is, the product prepared without the base is so dark and so acidic in nature as to be obviously unsuitable for the purpose contemplated.

The cutting oil base which may be used as a diluent in the reaction or to which the reaction product is added may be any hydrocarbon oil having a viscosity suiting it for cutting oil purposes, as is well known in the art.

The term "optical density" in the present disclosure represents the standard logarithmic ratio of intensity of an incident ray falling on a transparent or translucent medium to the intensity of the transmitted ray for a sample length of one meter and light of wave length from 1500 to 5500 Angstroms.

In view of the foregoing disclosure, variations and modifications will be apparent to one skilled in the art. The invention contemplates all such variations and modifications as come within the scope of the appended claims.

We claim:
1. A method of sulfurizing "motor polymer" which comprises adding increments of "motor polymer" to a mixture of sulfur monochloride and paraffin oil diluent while maintaining the reaction mixture at a temperature below 50° C., in the presence, from the beginning of the reaction and at all times, of an amount of a substantially anhydrous alkaline base not readily reactive with sulfur monochloride under the rection conditions in molal excess of the amount of sulfur monochloride reacting with the "motor polymer" to neutralize by-product hydrogen chloride as fast as it is formed, said process resulting in a clear, light-colored product substantially free from free chlorine and loosely bound chlorine.

2. A method of sulfurizing "motor polymer" which comprises alternately adding, to a mixture of sulfur monochloride and straw paraffin oil, increments of substantially anhydrous sodium carbonate and "motor polymer" while maintaining the reaction mixture at a temperature below about 35° C., said sodium carbonate being present, from the beginning and at all times, in the reaction mixture in molal excess of the amount of sulfur monochloride reacting with the "motor polymer" to neutralize by-product hydrogen chloride as fast as it is formed, said process resulting in a clear, light-colored product substantially free from free chlorine and loosely bound chlorine.

3. The reaction product of "motor polymer" and sulfur monochloride reacted at a temperature below 50° C. in the presence, from the beginning of the reaction, of a paraffin oil diluent and a substantially anhydrous alkaline base not readily reactive with sulfur monochloride under the reaction conditions, said "motor polymer" being added in increments to a mixture of said sulfur monochloride and said diluent, and said base being present at all times in the reaction mixture in molal excess of the amount of sulfur monochloride reacting with the "motor polymer" to neutralize by-product hydrogen chloride as fast as it is formed, said product being clear, light-colored and substantially free from free chlorine and loosely bound chlorine.

4. The reaction product of "motor polymer" and sulfur monochloride reacted at a temperature below about 35° C., in the presence, from the beginning of the reaction, of a straw paraffin oil and substantially anhydrous sodium carbonate, said sodium carbonate and said "motor polymer" being added alternately and in increments to a mixture of said sulfur monochloride and said straw paraffin oil, and said sodium carbonate being present at all times in the reaction mixture in molal excess of the amount of sulfur monochloride reacting with the "motor polymer" to neutralize by-product hydrogen chloride as fast as it is formed, said product being clear, light-colored and substantially free from free chlorine and loosely bound chlorine.

5. A cutting oil comprising a hydrocarbon oil having a cutting oil viscosity and containing the "motor polymer"-sulfur monochloride reaction product defined in claim 3 in an amount to improve the cutting properties of said hydrocarbon oil.

6. A cutting oil comprising a hydrocarbon oil having a cutting oil viscosity and containing the "motor polymer"-sulfur monochloride reaction product defined in claim 4 in an amount to improve the cutting properties of said hydrocarbon oil.

FRANKLIN VEATCH.
JOHN G. PARTCH.

REFERENCES CITED

The following references are of record in the file of this patent:

UNITED STATES PATENTS

| Number | Name | Date |
|---|---|---|
| 389,020 | Sommer | Sept. 4, 1888 |
| 2,234,545 | Auer | Mar. 11, 1941 |
| 2,249,312 | Kimball | July 15, 1941 |
| 2,313,611 | Abramowitz | Mar. 9, 1943 |
| 2,348,080 | Lincoln | May 2, 1944 |